US010725723B2

(12) United States Patent
Murakami

(10) Patent No.: US 10,725,723 B2
(45) Date of Patent: Jul. 28, 2020

(54) IMAGE PROCESSING APPARATUS AND IMAGE PROCESSING METHOD FOR DYNAMIC THUMBNAIL GENERATION OF OMNIDIRECTIONAL IMAGE

(71) Applicant: CANON KABUSHIKI KAISHA, Tokyo (JP)

(72) Inventor: Naotaka Murakami, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 415 days.

(21) Appl. No.: 15/048,325

(22) Filed: Feb. 19, 2016

(65) Prior Publication Data

US 2016/0246456 A1 Aug. 25, 2016

(30) Foreign Application Priority Data

Feb. 23, 2015 (JP) .................................. 2015-032926

(51) Int. Cl.
| | |
|---|---|
| *G06F 3/14* | (2006.01) |
| *G06F 3/0481* | (2013.01) |
| *G06F 3/0484* | (2013.01) |
| *H04N 5/232* | (2006.01) |
| *G03B 37/00* | (2006.01) |

(52) U.S. Cl.
CPC ........ *G06F 3/1454* (2013.01); *G06F 3/04817* (2013.01); *G06F 3/04845* (2013.01); *G03B 37/00* (2013.01); *G09G 2340/045* (2013.01); *G09G 2340/14* (2013.01); *H04N 5/23238* (2013.01)

(58) Field of Classification Search
CPC .. H04N 5/23238; G06T 3/4039; G03B 37/00; G06F 3/1454; G06F 3/04817; G06F 3/04845; G09G 2340/045; G09G 2340/14
See application file for complete search history.

(56) References Cited

U.S. PATENT DOCUMENTS

| | | | | |
|---|---|---|---|---|
| 5,818,439 | A * | 10/1998 | Nagasaka .......... | H04N 7/17336 725/87 |
| 8,379,053 | B1 * | 2/2013 | Phillips .................. | G06Q 30/02 345/619 |
| 9,179,116 | B1 * | 11/2015 | Liao ....................... | G11B 27/28 |

(Continued)

FOREIGN PATENT DOCUMENTS

| | | |
|---|---|---|
| JP | 01-024685 A | 1/1989 |
| JP | 07-110858 A | 4/1995 |

(Continued)

*Primary Examiner* — Ajay M Bhatia
*Assistant Examiner* — Phoebe X Pan
(74) *Attorney, Agent, or Firm* — Cowan, Liebowitz & Latman, P.C.

(57) ABSTRACT

An image processing apparatus according to the present invention includes: a display control unit configured to display a partial region of an original image on a first screen; and a changing unit configured to change the region to be displayed on the first screen in response to a user's operation, wherein the display control unit displays a list of a plurality of representative images corresponding to a plurality of original images each on a second screen, and wherein the representative images displayed on the second screen are based on partial images corresponding to regions of the original images changed by the changing unit each.

6 Claims, 8 Drawing Sheets

201

(56) References Cited

U.S. PATENT DOCUMENTS

| | | | | |
|---|---|---|---|---|
| 2002/0063725 A1* | 5/2002 | Tarbutton | G06F 17/30905 | 345/629 |
| 2004/0125133 A1* | 7/2004 | Pea | G06F 17/30014 | 715/751 |
| 2004/0263636 A1* | 12/2004 | Cutler | H04N 7/15 | 348/211.12 |
| 2007/0200936 A1* | 8/2007 | Terada | G11B 27/105 | 348/231.2 |
| 2007/0222884 A1* | 9/2007 | Mori | G11B 27/28 | 348/333.05 |
| 2008/0062168 A1* | 3/2008 | Poullier | H04N 1/00132 | 345/419 |
| 2008/0111831 A1* | 5/2008 | Son | G06T 3/4038 | 345/629 |
| 2011/0016429 A1* | 1/2011 | Yoshihama | G06F 3/04817 | 715/838 |
| 2011/0293201 A1* | 12/2011 | Uwai | H04N 5/781 | 382/305 |
| 2012/0162357 A1* | 6/2012 | Okegawa | G06T 3/0025 | 348/36 |
| 2012/0162393 A1* | 6/2012 | Okegawa | H04N 5/23209 | 348/50 |
| 2012/0166921 A1* | 6/2012 | Alexandrov | G06F 17/212 | 715/202 |
| 2013/0076681 A1* | 3/2013 | Sirpal | G06F 3/1438 | 345/173 |
| 2013/0326419 A1* | 12/2013 | Harada | G06F 3/04817 | 715/838 |
| 2014/0040742 A1* | 2/2014 | Park | G06F 3/0484 | 715/719 |
| 2014/0152764 A1* | 6/2014 | Kira | G01C 21/3647 | 348/36 |
| 2014/0181709 A1* | 6/2014 | Rainisto | G06F 3/0481 | 715/765 |
| 2014/0184821 A1* | 7/2014 | Taneichi | H04N 5/765 | 348/207.1 |
| 2014/0351763 A1* | 11/2014 | Lee | G03B 37/00 | 715/838 |
| 2015/0070463 A1* | 3/2015 | Nakajima | H04N 5/23238 | 348/36 |
| 2015/0130893 A1* | 5/2015 | Kimura | G03B 37/00 | 348/36 |
| 2015/0215532 A1* | 7/2015 | Jafarzadeh | H04N 5/23238 | 348/36 |
| 2015/0331242 A1* | 11/2015 | Cho | G02B 27/017 | 345/8 |
| 2016/0080643 A1* | 3/2016 | Kimura | H04N 5/23206 | 348/207.1 |
| 2016/0080647 A1* | 3/2016 | Kimura | H04N 1/3876 | 348/36 |
| 2016/0132991 A1* | 5/2016 | Fukushi | A63F 13/5255 | 345/667 |
| 2018/0032830 A1* | 2/2018 | Kim | G06T 7/70 | |
| 2018/0068639 A1* | 3/2018 | Kim | G06F 3/04815 | |
| 2018/0095650 A1* | 4/2018 | Park | G06F 3/0412 | |
| 2018/0121064 A1* | 5/2018 | Lee | H04N 13/398 | |
| 2018/0184000 A1* | 6/2018 | Lee | H04N 5/23238 | |
| 2018/0373483 A1* | 12/2018 | Inamoto | G06F 3/1454 | |

FOREIGN PATENT DOCUMENTS

| | | |
|---|---|---|
| JP | 2005-269563 A | 9/2005 |
| JP | 2013-027021 A | 2/2013 |
| JP | 2014-006880 A | 1/2014 |
| JP | 2014-131215 A | 7/2014 |

* cited by examiner

EXAMPLE OF STORING ANGLE-OF-VIEW INFORMATION OF LASTLY-DISPLAYED PARTIAL IMAGE

| OMNIDIRECTIONAL IMAGE | ANGLE-OF-VIEW INFORMATION |
|---|---|
| 123.jpg | E, F, G, H |
| 456.jpg | M, N, O, P |
| ... | ... |
| xyz.jpg | NONE |

FIG. 8B

EXAMPLE OF STORING ANGLE-OF-VIEW INFORMATION OF PARTIAL IMAGE WHOSE DISPLAY TIME IS LONGEST

| OMNIDIRECTIONAL IMAGE | ANGLE-OF-VIEW INFORMATION | DISPLAY TIME |
|---|---|---|
| 123.jpg | E, F, G, H | 1.8 sec |
| 456.jpg | M, N, O, P | 15.3 sec |
| ... | ... | ... |
| xyz.jpg | NONE | 0 sec |

IMAGE PROCESSING APPARATUS AND IMAGE PROCESSING METHOD FOR DYNAMIC THUMBNAIL GENERATION OF OMNIDIRECTIONAL IMAGE

BACKGROUND OF THE INVENTION

Field of the Invention

The present invention relates to an image processing apparatus and an image processing method.

Description of the Related Art

In recent years, digital cameras capable of performing omnidirectional photographing around photographers to generate omnidirectional images have been rolled out. Omnidirectional images have entire celestial sphere shapes and are large in size. Therefore, in the reproduction of omnidirectional images, geometric conversion processing is generally applied to the omnidirectional images to display some regions (partial regions) of the omnidirectional images having undergone the geometric conversion processing (Japanese Patent Application Laid-open No. 2014-6880 and Japanese Patent Application Laid-open No. 2013-27021). Users can discriminate omnidirectional images by successively switching and displaying partial regions. With this method, however, users are required to confirm partial images, which are successively switched and displayed, for a long period of time to discriminate omnidirectional images, and they cannot easily discriminate the omnidirecitional images.

As an image display method that allows users to easily discriminate images, there has been known a method of displaying thumbnail images obtained by downsizing entire images. In omnidirectional images, however, objects are curved and directions (vertical and horizontal directions) of the object depends on positions inside the omnidirectional images. Therefore, users have difficulty understanding the contents of omnidirectional images and their thumbnail images and discriminating omnidirectional images from thumbnail images of the omnidirectional images.

Here, a method of displaying thumbnail images of omnidirectional images having undergone the geometric conversion processing is assumed. However, since omnidirectional images are large in size, objects in thumbnail images of the omnidirectional images are extremely finely displayed. Therefore, users also have difficulty understanding the contents of thumbnail images of omnidirectional images having undergone the geometric conversion processing and discriminating omnidirectional images from thumbnail images of the omnidirectional images having undergone the geometric conversion processing.

In technology disclosed in Japanese Patent Application Laid-open No. 2014-6880, thumbnail images in some regions of omnidirectional images are generated. However, since this technology requires a user's operation to select and specify regions for thumbnail images, users are not allowed to easily generate the thumbnail images.

SUMMARY OF THE INVENTION

The present invention provides technology capable of easily generating thumbnail images that allow users to easily discriminate images.

The present invention in its first aspect provides an image processing apparatus comprising:
   a display control unit configured to display a partial region of an original image on a first screen; and
   a changing unit configured to change the region to be displayed on the first screen in response to a user's operation,
   wherein the display control unit displays a list of a plurality of representative images corresponding to a plurality of original images each on a second screen,
   and wherein the representative images displayed on the second screen are based on partial images corresponding to regions of the original images changed by the changing unit each.

The present invention in its second aspect provides an image processing method comprising:
   displaying a partial region of an original image on a first screen;
   changing the region to be displayed on the first screen in response to a user's operation;
   displaying the changed region of the original image on the first screen; and
   displaying a list of a plurality of representative images corresponding to a plurality of original images each on a second screen,
   wherein the representative images displayed on the second screen are based on partial images corresponding to changed regions of the original images each.

The present invention in its third aspect provides a non-transitory computer readable medium that stores a program, wherein the program causes a computer to execute
   displaying a partial region of an original image on a first screen;
   changing the region to be displayed on the first screen in response to a user's operation;
   displaying the changed region of the original image on the first screen; and
   displaying a list of a plurality of representative images corresponding to a plurality of original images each on a second screen,
   wherein the representative images displayed on the second screen are based on partial images corresponding to changed regions of the original images each.

According to an embodiment of the present invention, it is possible to easily generate thumbnail images that allow users to easily discriminate images.

Further features of the present invention will become apparent from the following description of exemplary embodiments with reference to the attached drawings.

BRIEF DESCRIPTION OF THE DRAWINGS

FIGS. 8A and 8B are diagrams showing an example of angle-of-view information according to the embodiment.

DESCRIPTION OF THE EMBODIMENTS

Hereinafter, a description will be given of an image processing apparatus and an image processing method according to an embodiment of the present invention. Note that although the image processing apparatus according to the embodiment is provided in a digital camera as an example, it may be provided in a personal computer, a smart phone, or the like.

(Configuration)

Figure 1:
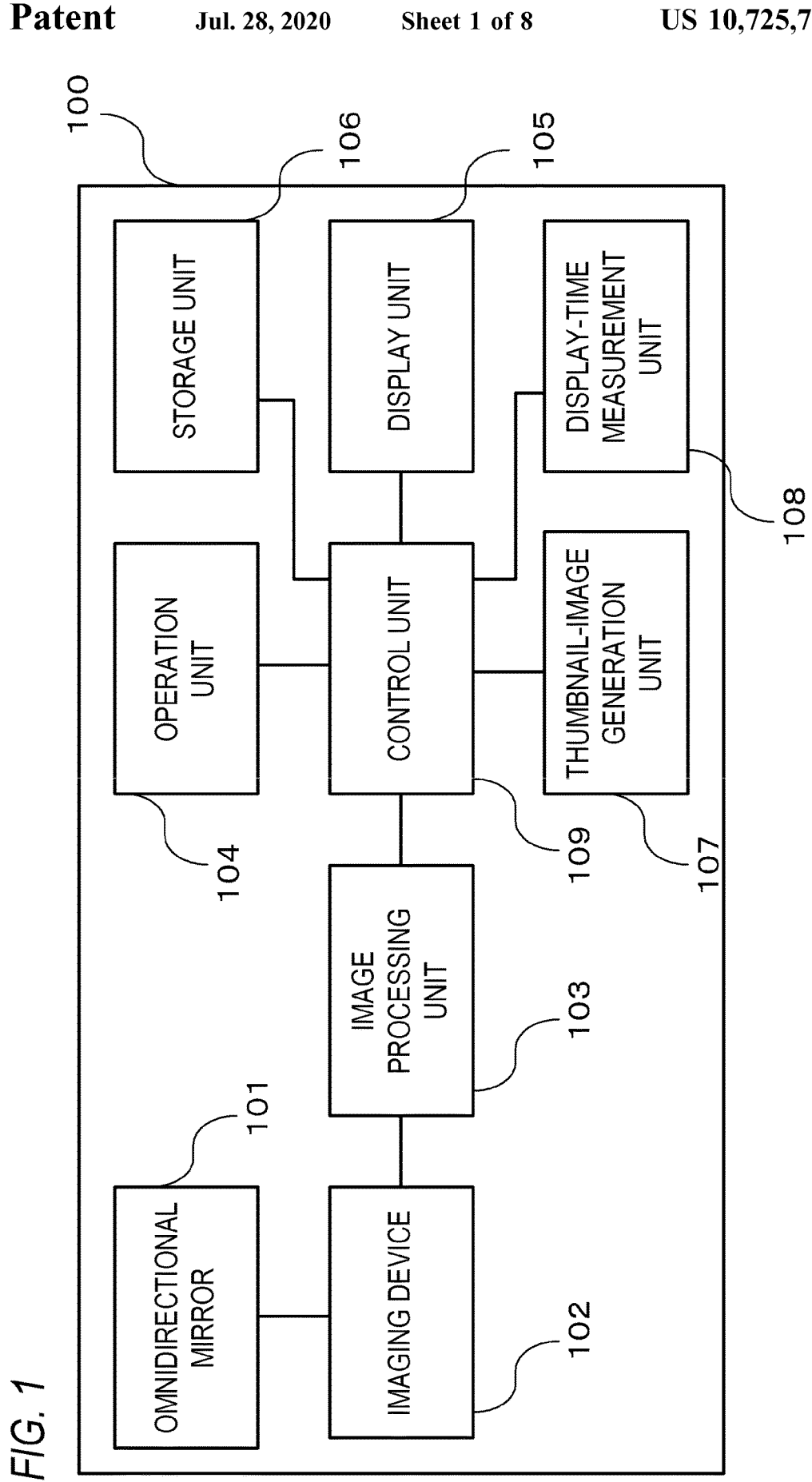
FIG. 1 is a block diagram showing an example of the functional configuration of a digital camera according to an embodiment.

First, an example of the configuration of a digital camera according to the embodiment will be described. FIG. 1 is a block diagram showing an example of the functional configuration of a digital camera 100 according to the embodiment.

An omnidirectional mirror 101 mirror-reflects light from all directions (360 degrees) around the digital camera 100 and introduces the light into an imaging device 102. As the omnidirectional mirror 101, a hyperboloidal mirror, a spherical mirror, an all-round eye-fish lens, or the like may be used.

The imaging device 102 performs imaging using light from the omnidirectional mirror. Specifically, the imaging device 102 converts light from the omnidirectional mirror into an electric signal (image data). Then, the imaging device 102 outputs the obtained image data to an image processing unit 103. As the imaging device 102, a CCD sensor, a CMOS sensor, or the like may be used.

The image processing unit 103 applies image processing or compression processing to image data output from the imaging device 102. The imaging device 102 is constituted by a plurality of imaging devices, and the image processing unit 103 combines together a plurality of images obtained by the imaging devices 102, respectively, to generate omnidirectional image data and then outputs the generated omnidirectional image data. In the embodiment, the image processing unit 103 also performs distortion correction processing to correct the distortion of an image as image processing. In the embodiment, an image represented by image data having undergone the distortion correction processing will be described as an "original image" or a "plane image."

Note that the image processing is not limited to the distortion correction processing. As the image processing, the image processing unit 103 may perform image stabilizing processing to correct the disorder of an image due to the fluctuation of the digital camera 100, brightness correction processing to correct the brightness of an image, color correction processing to correct the color of an image, a range correction processing to correct the dynamic range of an image, or the like.

Even if the imaging device 102 is constituted by one imaging device, omnidirectional image data may be generated in such a way that a person performs imaging a plurality of times while changing an angle-of-view to output a plurality of image data from the imaging device 102 and then the image processing unit 103 combines the plurality of image data together.

An operation unit 104 is a reception unit that receives a user's operation with respect to the digital camera 100. The user's operation is a photographing operation to instruct the start of photographing, a specifying operation to specify a particular region of an original image or change a specified region, or the like. In the embodiment, a partial image that is an original image in a region specified by the specifying operation is displayed. In this sense, a region specified by the specifying operation may be called a "region to be displayed."

Note that a button or a touch panel provided in the digital camera 100 may be defined as the "operation unit 104" or a reception unit that receives an electric signal according to a user's operation with respect to the digital camera 100 may be defined as the "operation unit 104."

A display unit 105 displays an image corresponding to image data input to the display unit 105. The display unit 105 displays, for example, a live-view image, a photographed image, a thumbnail image, a menu image, an alert image, or the like. The live-view image is an image representing a current object, the photographed image is an image stored according to a photographing operation, and the thumbnail image is a small image representing a photographed image. The menu image is an image used to set up or confirm the various parameters of the digital camera 100, and the alert image is an image representing various alerts.

A storage unit 106 stores various images or information. For example, the storage unit 106 stores image data output from the image processing unit 103 according to a photographing operation as image data representing a photographed image. In the embodiment, the storage unit 106 stores an omnidirectional image having undergone the distortion correction processing (i.e., an original image) as a photographed image. In addition, the storage unit 106 stores angle-of-view information representing a region (angle-of-view) of a displayed partial image. As the storage unit 106, a non-volatile memory, an optical disk, a magnetic disk, or the like may be used.

Note that the storage unit 106 may store an image having not undergone the distortion correction processing as a photographed image and an original image may be generated by the distortion correction processing in a case where the photographed image is displayed. In addition, in a case where the image processing unit 103 performs a plurality of processing, at least some of the plurality of processing may be performed at timing at which a photographed image is displayed rather than being performed at timing at which the photographed image is stored.

A thumbnail image generation unit 107 generates a thumbnail image of a photographed image (an omnidirectional image) stored in the storage unit 106 and stores the generated thumbnail image in the storage unit 106 so as to be associated with the photographed image. In a case where the storage unit 106 stores a plurality of omnidirectional images, it generates and stores a thumbnail image for each of the plurality of omnidirectional images.

A display-time measurement unit 108 measures time (display time) during which a partial image is displayed.

A control unit 109 controls each of the functional units of the digital camera 100. For example, the control unit 109 performs display control to display various images such as a partial image on the display unit 105.

Note that the image processing apparatus according to the embodiment may only be required to have at least the operation unit 104, the control unit 109, and the thumbnail-image generation unit 107.

(Display Control)

Next, an example of display control according to the embodiment will be described.

Figure 2:
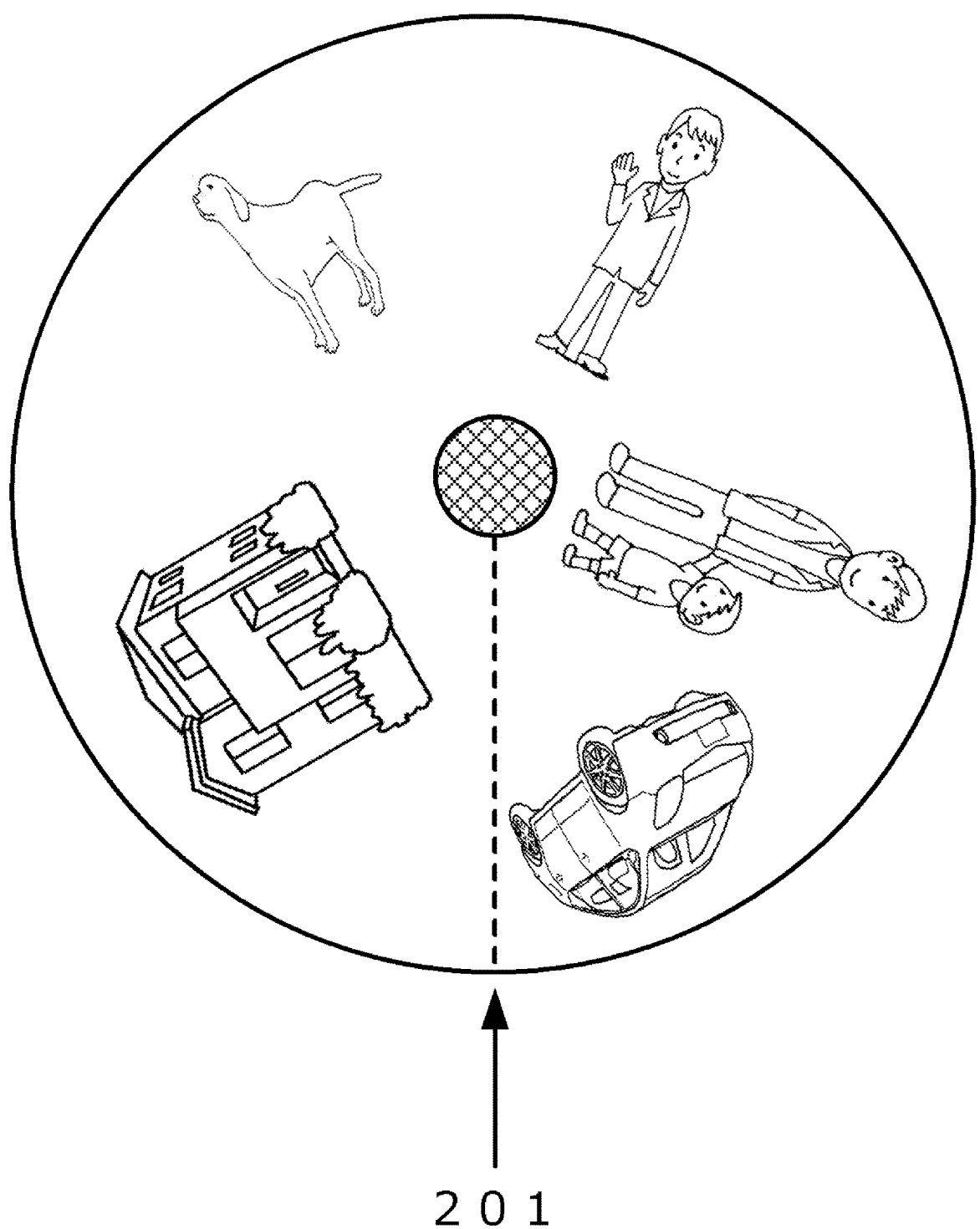
FIG. 2 is a diagram showing an example of an omnidirectional image according to the embodiment.

FIG. 2 is a schematic diagram showing an example of an omnidirectional image (omnidirectional image having not undergone the distortion correction processing) generated by the imaging device 102. The imaging device 102 generates, for example, a doughnut-shaped image centering on the position of the digital camera 100 as an omnidirectional image. Such an omnidirectional image is generated since an angle-of-view in a vertical direction with respect to a real image is determined by the curvature of the front surface of the omnidirectional mirror 101 and the real image is projected onto the imaging device 102 with distortion.

Figure 3:
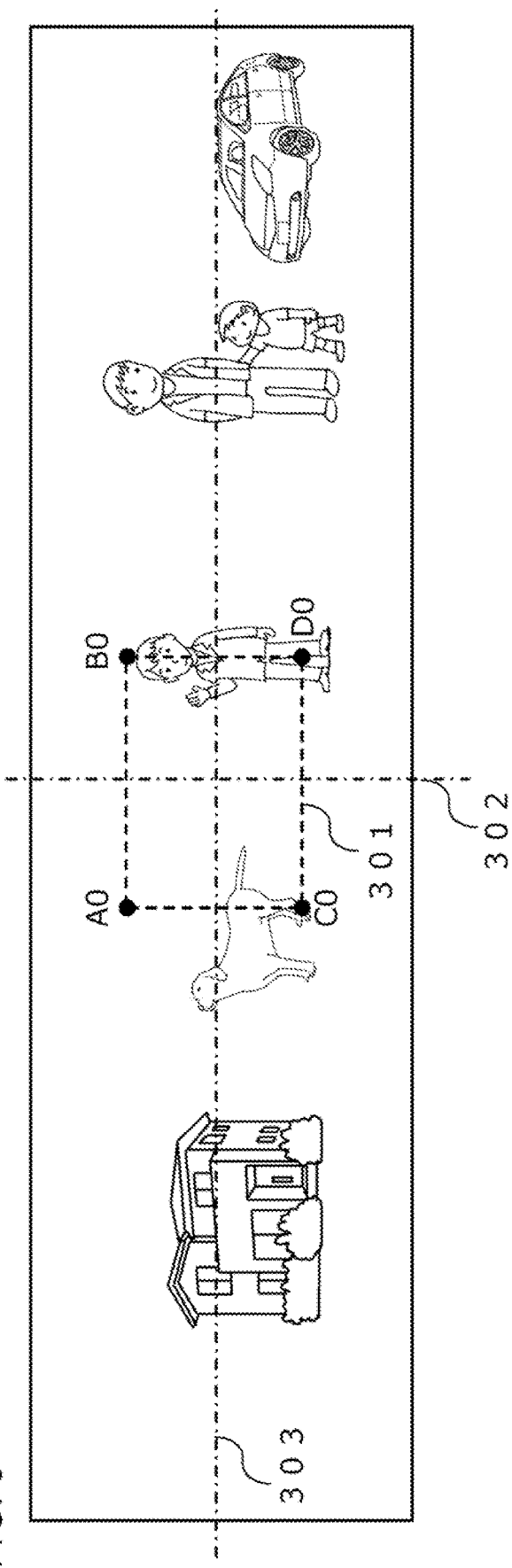
FIG. 3 is a diagram showing an example of an omnidirectional image and a partial region according to the embodiment.

The image processing unit 103 applies the distortion correction processing to such an omnidirectional image with distortion. As a result, an omnidirectional image with distortion as shown in FIG. 2 is developed into a rectangular omnidirectional image (plane image) as shown in FIG. 3. An omnidirectional image shown in FIG. 2 is a doughnut-shaped image. In order to develop the distorted image into a rectangular image, the distorted image is required to be cut off in any direction. In a case where the omnidirectional image shown in FIG. 2 is cut off at a position 201 to remove its distortion, an omnidirectional image shown in FIG. 3 is obtained.

Figure 4:
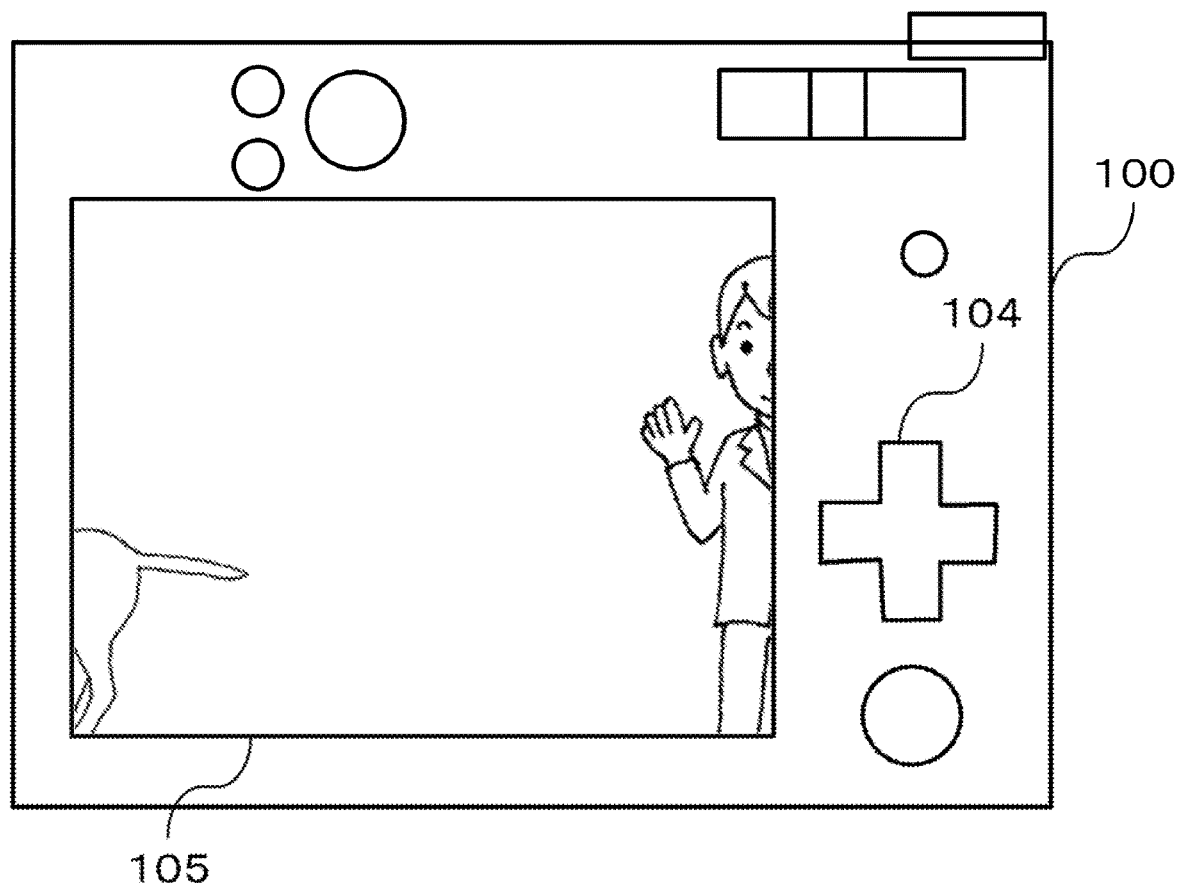
FIG. 4 is a diagram showing an example of a state in which a partial image is displayed according to the embodiment.

Since a plane image is large in size, some (a partial region) of the plane image is generally extracted to display the plane image. In FIG. 3, a dashed line 302 represents a central position in the horizontal direction of the plane image, while a dashed line 303 represents a central position in the vertical direction of the plane image. A region surrounded by a broken line 301 is a partial region corresponding to the center of the plane image. The center of the partial region 301 (the region surrounded by the broken line 301) coincides with the center of the plane image. The partial region 301 is a rectangular region, and coordinates at the upper-left corner, the upper-right corner, the lower-left corner, and the lower-right corner of the partial region 301 are represented by A0, B0, C0, and D0, respectively. In the embodiment, the partial region 301 is used as the first partial region (initial partial region). That is, in a case where a stored plane image (photographed image) is first displayed, the plane image in the partial region 301 is displayed. FIG. 4 is a diagram showing a state in which the plane image in the partial region 301 is displayed. Note that a region different from the partial region 301 may be used as an initial partial region.

Figure 5:
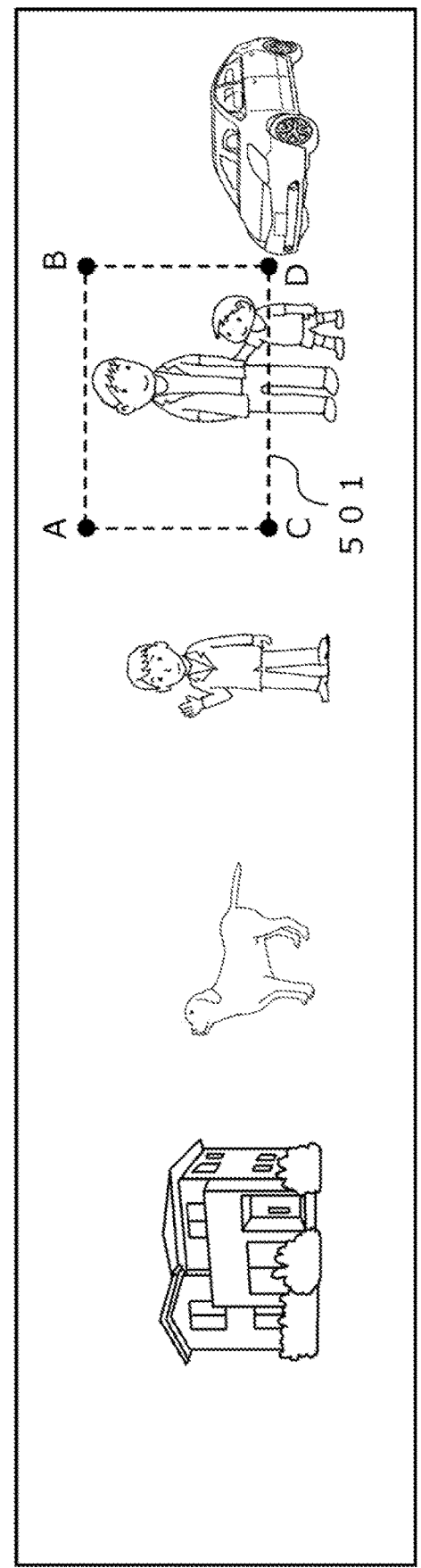
FIG. 5 is a diagram showing an example of the omnidirectional image and a partial region according to the embodiment.
Figure 6:
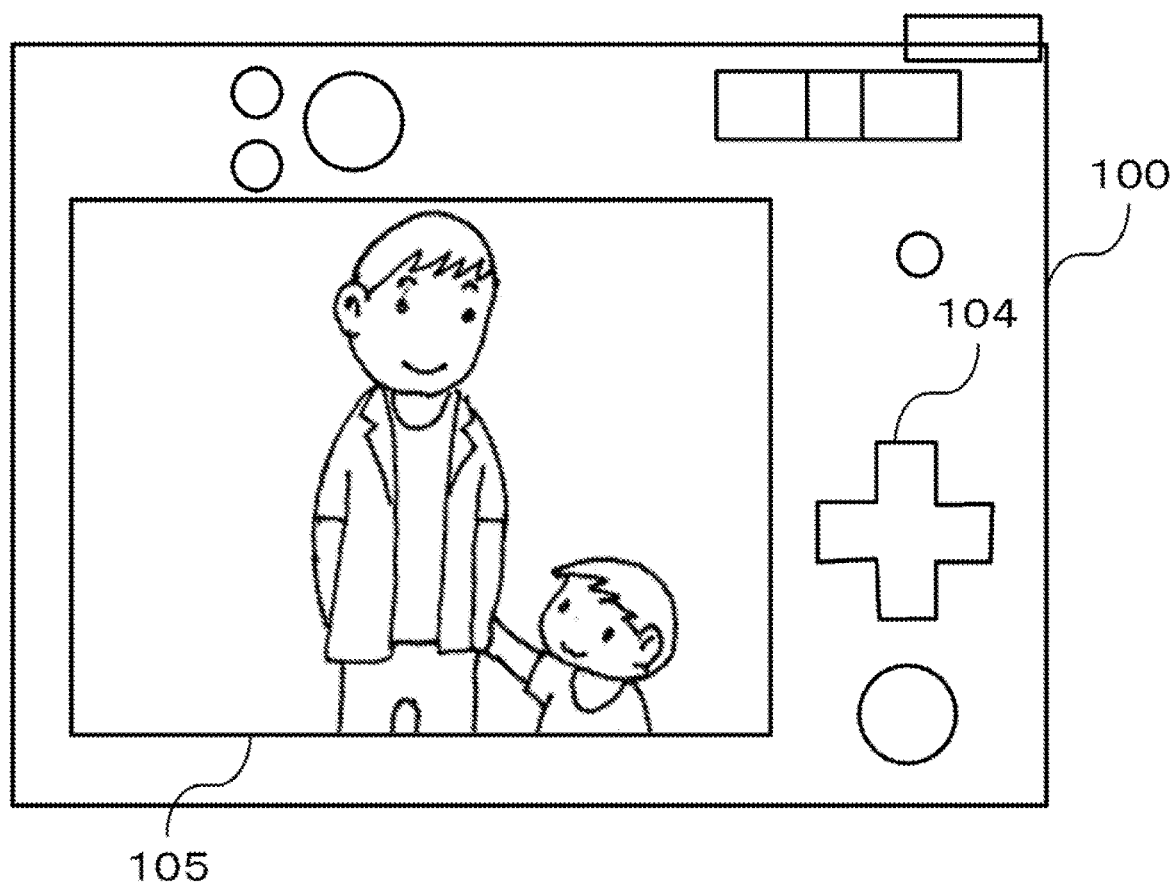
FIG. 6 is a diagram showing an example of a state in which a partial image is displayed according to the embodiment.

A user may change the partial region 301 by performing a specifying operation. For example, in a case where the user performs the specifying operation to move a partial region, the partial region moves according to the specifying operation and the display unit 105 changes its display with the movement of the partial region. Specifically, since the display unit 105 displays a partial image (a plane image in a partial region), it changes its display such that the image moves in a direction opposite to the movement direction of the partial region. FIG. 5 is a diagram showing an example of a partial region changed according to a specifying operation. A region surrounded by a broken line 501 represents a partial region changed according to a specifying operation. A partial region 501 is a rectangular region, and the coordinates at the upper-left corner, the upper-right corner, the lower-left corner, and the lower-right corner of the partial region 501 are represented by A, B, C, and D, respectively. In a case where the partial region 501 is specified, a plane image in the partial region 501 is displayed. FIG. 6 is a diagram showing a state in which the plane image in the partial region 501 is displayed.

(Operation)

Figure 7:
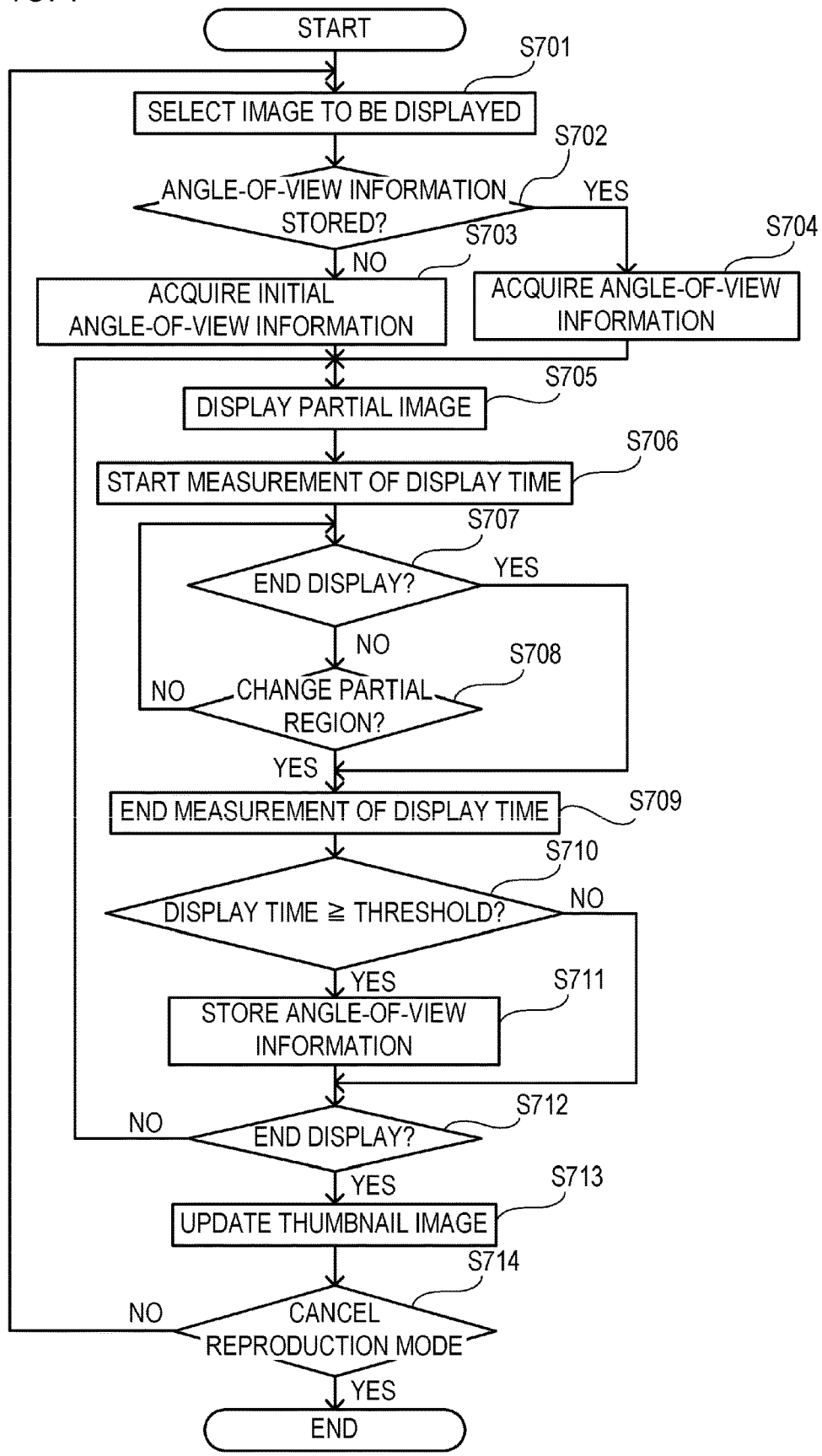
FIG. 7 is a flowchart showing an example of the operation of the digital camera according to the embodiment.

Next, an example of the operation of the digital camera according to the embodiment will be described using FIG. 7. FIG. 7 is a flowchart showing an example of the operation of the digital camera 100. The flowchart of FIG. 7 assumes, for example, a case in which a reproduction mode to display (reproduce) a stored photographed image is set as the operation mode of the digital camera 100.

First, in S701, the control unit 109 selects one of a plurality of omnidirectional images stored in the storage unit 106 as an image to be displayed according to a user's operation (selective operation) with respect to the digital camera 100. Specifically, with the user's selective operation, the operation unit 104 outputs a selection signal corresponding to the selective operation to the control unit 109. Then, the control unit 109 selects an omnidirectional image to be displayed according to the selection signal. The selective operation is, for example, a user's operation in which one of a plurality of thumbnail images (a plurality of thumbnail images corresponding to a plurality of omnidirectional images) displayed on the display unit 105 by the control unit 109 is selected.

Note that although the thumbnail image is updated by the following processing of S713 in the embodiment, a method of generating the thumbnail image (initial thumbnail image) at first is not particularly limited. As the initial thumbnail image, an image obtained by downsizing an omnidirectional image may be generated or an image obtained by downsizing an omnidirectional image in a predetermined region (for example, an initial partial region) may be generated.

Next, in S702, the control unit 109 determines whether the storage unit 106 has stored angle-of-view information corresponding to the omnidirectional image (selection image) selected in S701. In a case where it is determined that the storage unit 106 has stored the angle-of-view information corresponding to the selection image, the control unit 109 acquires the angle-of-view information corresponding to the selection image from the storage unit 106 in S704. In a case where it is determined that the storage unit 106 has not stored the angle-of-view information corresponding to the selection image, the control unit 109 acquires initial angle-of-view information as angle-of-view information representing an initial partial region from the storage unit 106 in S703. Then, the processing proceeds from S703 or S704 to S705.

In S705, the control unit 109 performs display control to display the partial image of the selection image on the display unit 105 based on the angle-of-view information obtained by the processing of S703 or S704. Specifically, the control unit 109 performs the display control to display the selection image in a partial region represented by the acquired angle-of-view information.

Then, in S706, the display-time measurement unit 108 starts measuring the display time of the partial image (the target partial image) displayed by the processing of S705.

Next, in S707, the control unit 109 determines whether an ending operation as a user's operation to end the display of the selection image (the partial image of the selection image) has been performed. The processing of S707 may be realized by the control unit 109 monitoring a signal output from the operation unit 104 according to the user's operation. The processing proceeds to S708 in a case where it is determined that the ending operation has not been performed or proceeds to S709 in a case where it is determined that the ending operation has been performed.

In S708, the control unit 109 determines whether a specifying operation to change the partial region has been performed. As in the processing of S707, the processing of S708 may be realized by the control unit 109 monitoring a signal output from the operation unit 104 according to a user's operation. The processing returns to S707 in a case where it is determined that the specifying operation has not been performed or proceeds to S709 in a case where it is determined that the specifying operation has been performed.

In S709, the display-time measurement unit 108 ends the measurement of the display time of the target partial image. As a result, time during which the partial display image has been displayed is obtained as the measurement value (the measurement time) of the display time.

Then, in S710, the control unit 109 determines whether the measurement time obtained in S709 is a threshold or more. In a case where it is determined that the measurement time is the threshold or more, the control unit 109 assumes that the target partial image has been displayed as the partial image and the processing proceeds to S711. In a case where it is determined that the measurement time is shorter than the threshold, the control unit 109 assumes that the target partial image has not been displayed as the partial image and the processing proceeds to S712. Note that the threshold may be a fixed value set in advance by a manufacturer or a value capable of being changed by a user.

Here, attention is paid to a case in which the position of a partial region is scrolled. In this case, a partial image is likely to be displayed for a short period of time during the scrolling. In the embodiment, a thumbnail image of a displayed partial image (a thumbnail image obtained by downsizing the partial image) is generated as a thumbnail image of an omnidirectional image by the following processing of S713. A thumbnail image obtained by downsizing a partial image is larger in object size than a thumbnail image obtained by downsizing an omnidirectional image. Further, a displayed partial image is highly likely to be seen by a user and printed in user's memory. Therefore, compared with a thumbnail image obtained by downsizing an omnidirectional image, a thumbnail image obtained by downsizing a displayed partial image facilitates the comprehension of the content of the image and the discrimination of the omnidirectional image. However, a partial image displayed for a short period of time is not likely to be printed in user's memory. Therefore, a user may not discriminate an omnidirectional image from a thumbnail image of a partial image displayed for a short period of time. Therefore, in the embodiment, the processing flow changes according to the determination result of S710. In this way, a partial image displayed for a short period of time may be prevented from being used for the generation of a thumbnail image, and a thumbnail image that allows a user to easily discriminate an image may be more reliably generated.

In S711, the control unit 109 stores angle-of-view information representing the region (the partial region) of the target partial image in the storage unit 106 as angle-of-view information corresponding to the selection image. In the embodiment, in a case where the storage unit 106 has already stored the angle-of-view information corresponding to the selection image, the angle-of-view information stored in the storage unit 106 is updated to the angle-of-view information representing the region of the target partial image. Therefore, the storage unit 106 stores only angle-of-view information representing a lastly-displayed partial image among a plurality of displayed partial images as angle-of-view information corresponding to an omnidirectional image. As a result, a thumbnail image of a lastly-displayed partial image among a plurality of displayed partial images is generated as a thumbnail image of an omnidirectional image by the following processing of S713. A lastly-displayed partial image is highly likely to be printed in user's memory. Therefore, since a thumbnail image of a lastly-displayed partial image is generated as a thumbnail image of an omnidirectional image, the thumbnail image that allows a user to easily discriminate the image may be more reliably generated. The processing of S712 proceeds in succession to S711.

FIG. 8A is a diagram showing an example of angle-of-view information stored in the storage unit 106. FIG. 8A shows an example of a case in which a partial image having apex coordinates (coordinates at the upper-left corner, the upper-right corner, the lower-left corner, and the lower-right corner of a partial region) represented by E, F, G, and H, respectively is lastly displayed as a partial image of an omnidirectional image "123.jpg." In addition, FIG. 8A shows an example of a case in which a partial image having apex coordinates represented by M, N, O, and P is lastly displayed as a partial image of an omnidirectional image "456.jpg." Moreover, FIG. 8A shows an example of a case in which a partial image of an omnidirectional image "xyz.jpg" is not displayed. Therefore, as shown in FIG. 8A, the storage unit 106 stores "E, F, G, and H" as the angle-of-view information of the omnidirectional image "123.jpg" and stores "M, N, O, and P" as the angle-of-view information of the omnidirectional image "456.jpg." Further, the storage unit 106 does not store the angle-of-view information of the omnidirectional image "xyz.jpg."

Note that the storage unit 106 may store initial angle-of-view information as angle-of-view information corresponding to a non-displayed omnidirectional image. For example, in a case of storing an omnidirectional image, the storage unit 106 may store the omnidirectional image so as to be associated with initial angle-of-view information.

In S712, the control unit 109 determines whether an ending operation as a user's operation to end the display of the selection image (the partial image of the selection image) has been performed. In a case where it is determined that the ending operation has not been performed, the processing returns to S705. At this time, in a case where the determination result of S708 shows that "the specifying operation to change the partial region has been performed", display control to display a selection image in a changed partial region is performed in S705. In a case where it is determined that the ending operation has been performed, the processing proceeds to S713.

In S713, the thumbnail-image generation unit 107 generates and updates a thumbnail image of the selection image. Specifically, the thumbnail-image generation unit 107 acquires angle-of-view information corresponding to the selection image from the storage unit 106 and generates a thumbnail image based on the acquired angle-of-view information. In the embodiment, the thumbnail-image generation unit 107 downsizes a selection image in a partial region represented by the acquired angle-of-view information to generate a thumbnail image. Then, the thumbnail-image generation unit 107 updates a thumbnail image corresponding to the selection image among a plurality of thumbnail images stored in the storage unit 106 to the generated thumbnail image. As described above, in the embodiment, a thumbnail image of a selection image is updated in a case where the display of the selection image (the partial image of the selection image) is ended.

Note that timing at which a thumbnail image is updated is not limited to the above timing. For example, a thumbnail image of a selection image may be updated every time a partial image of the selection image is displayed.

In S714, the control unit 109 determines whether a mode cancellation operation as a user's operation to cancel the setting of the reproduction mode has been performed. The processing of S714 may be realized by the control unit 109 monitoring a signal output from the operation unit 104 according to the user's operation. The processing returns to S701 in a case where it is determined that the mode cancellation operation has not been performed or the processing of the flowchart ends in a case where it is determined that the mode cancellation operation has been performed.

A specific example of the operation of the digital camera 100 after the update of a thumbnail image will be described. Here, an example of a case in which the partial image shown in FIG. 6 (the omnidirectional image in the partial region 501 of FIG. 5) is lastly displayed will be described. In this case, in S711, angle-of-view information "A, B, C, and D" is stored. Then, in S713, the thumbnail image obtained by downsizing the partial image shown in FIG. 6 is generated, and the generated thumbnail image is stored as a thumbnail image of the omnidirectional image.

In a case where the reproduction mode is set after the update of the thumbnail image of the omnidirectional image, the control unit 109 displays the updated thumbnail image (the thumbnail image obtained by downsizing the partial image shown in FIG. 6) on the display unit 105. As described above, a lastly-displayed partial image is highly likely to be printed in user's memory. Therefore, a user may associate a thumbnail image of a lastly-displayed partial image with his/her memory to easily discriminate an omnidirectional image corresponding to the thumbnail image.

In addition, in the embodiment, as display control in the period between the generation of a thumbnail image of a partial image and a specifying operation, display control to display the partial image on the display unit 105 is performed. Specifically, angle-of-view information "A, B, C, and D" is acquired in S704 in a case where an omnidirectional image (a partial image of the omnidirectional image) is displayed again. Then, in S705, the partial image having apex coordinates represented by A, B, C, and D is displayed. Therefore, a user may resume viewing from a state at the end of the last viewing time without performing an operation to change a display state (a partial region) to the state at the end of the last viewing time. For example, a user may efficiently view an omnidirectional image without repeatedly performing the same operation as that performed at the last viewing time.

Note that the display control in the period between the generation of a thumbnail image of a partial image and a specifying operation is not limited to the above display control. For example, as the display control in the period between the generation of a thumbnail image of a partial image and a specifying operation, display control to display a selection image in an initial partial region may be performed.

As described above, a thumbnail image of a displayed partial image is automatically generated according to the embodiment. By this simple processing, a thumbnail image that allows a user to easily discriminate an original image may be easily generated.

Note that although the embodiment describes an example of a case in which an original image is an omnidirectional image, the original image may be any image. For example, the original image may be a panoramic image obtained by performing photographing in a wide-angle range rather than performing photographing in an omnidirectional range. The original image may be an image other than a photographed image. For example, the original image may be an illustration image.

The preferred embodiment of the present invention is described above. However, the present invention is not limited to the above embodiment but may be modified or changed in various ways without departing from its scope.

Although the embodiment describes an example in which a thumbnail image of a lastly-displayed partial image is generated, a thumbnail image of a partial image whose display time (measurement time) is the longest may be generated. An example of a method of realizing such processing will be described. First, measurement time is also stored in a case where angle-of-view information is stored. Then, in a case where the angle-of-view information and the measurement time are stored (updated) again, the measurement time to be stored and the measurement time that has been stored are compared with each other. In a case where the measurement time to be stored is longer than the measurement time that has been stored, the angle-of-view information and the measurement time are updated. Otherwise, the update of the angle-of-view information and the measurement time is omitted. In this way, a thumbnail image of a partial image for which the measurement time is the longest may be generated based on the angle-of-view information of the partial image for which the measurement time is the longest. A partial image whose display time is the longest is highly likely to be printed in user's memory. Therefore, since a thumbnail image of a displayed partial image whose display time is the longest is generated as a thumbnail image of an omnidirectional image, the thumbnail image that allows a user to easily discriminate the image may be more reliably generated.

FIG. 8B is a diagram showing an example of angle-of-view information stored in the storage unit 106. FIG. 8B shows an example of a case in which the partial image having apex coordinates represented by E, F, G, and H is displayed for the longest time as the partial image of the omnidirectional image "123.jpg" and shows an example of a case in which the partial image having apex coordinates represented by E, F, G, and H is displayed for 1.8 seconds. In addition, FIG. 8B shows an example of a case in which the partial image having apex coordinates represented by M, N, O, and P is displayed for the longest time as the partial image of the omnidirectional image "456.jpg" and shows an example of a case in which the partial image having apex coordinates represented by M, N, O, and P is displayed for 15.3 seconds. Moreover, FIG. 8B shows an example of a case in which the partial image of the omnidirectional image "xyz.jpg" is not displayed. Therefore, as shown in FIG. 8B, the storage unit 106 stores "E, F, G, and H" as the angle-of-view information of the omnidirectional image "123.jpg" and stores "1.8 seconds" as the display time of the omnidirectional image "123.jpg." The storage unit 106 stores "M, N, O, and P" as the angle-of-view information of the omnidirectional image "456.jpg" and stores "15.3 seconds" as the display time of the omnidirectional image "456.jpg." Further, the storage unit 106 does not store the angle-of-view information of the omnidirectional image "xyz.jpg" and stores "0 seconds" as the display time of the omnidirectional image "xyz.jpg."

A method of generating a thumbnail image of a displayed partial image may not be particularly limited so long as the thumbnail image is generated. For example, in a case where a plurality of angle-of-view information is stored with respect to one original image and one of the plurality of stored angle-of-view information is selected, a thumbnail image may be generated based on the selected angle-of-view information. A user may select one of a plurality of methods of generating a thumbnail image.

In addition, the embodiment describes an example in which a partial image whose display time (measurement time) is shorter than a threshold is regarded as a non-displayed partial image in a case where a thumbnail image is generated. However, a thumbnail image may be generated in consideration of all the partial images subjected to display control regardless of display time.

In addition, a partial image having no predetermined characteristic may be regarded as a non-displayed partial image in a case where a thumbnail image is generated. Therefore, a thumbnail image that allows a user to easily discriminate an image may be more reliably generated.

The predetermined characteristic is, for example, the face of a person. In this case, a partial image not including the face of a person is regarded as a non-displayed partial image. The partial region 501 of FIG. 5 includes the two faces of persons. Therefore, it is determined that the partial image corresponding to the partial region 501 includes the predetermined characteristics. By such determination, a thumbnail image of a partial image having no object may be prevented from being generated and a thumbnail image that allows a user to easily discriminate an image may be more reliably generated. As the predetermined characteristic, an object (such as an automobile, an animal, a building, and a plant) other than a face may be used. Determination as to whether an image includes a predetermined object may be realized by appropriately using existing technology to determine the image. As the predetermined characteristic, brightness higher than a threshold, the number of colors greater than a threshold, a tone difference greater than a threshold, or the like other than an object may be used.

Note that one of a partial image whose display time is shorter than a threshold and a partial image having no predetermined characteristic may be regarded as a non-displayed partial image, or both of them may be regarded as non-displayed partial images. Only a partial image whose display time is shorter than a threshold and having no predetermined characteristic may be regarded as a non-displayed image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-032926, filed on Feb. 23, 2015, which is hereby incorporated by reference herein in its entirety.

What is claimed is:

1. An image processing apparatus comprising:
a processor executing computer instructions that cause the processor to operate as:
a display control unit configured to display a partial region of an omnidirectional image on a first screen;
a changing unit configured to change the partial region of the omnidirectional image to be displayed on the first screen in response to a user's operation;
a measurement unit configured to measure time during which each of partial regions of the omnidirectional image is displayed on the first screen;
a generating unit configured to generate a thumbnail image from the omnidirectional image based on an angle-of-view information; and
an electronic memory, configured to store the angle-of-view information representing a position of the partial region of the omnidirectional image which is displayed on the first screen and associating with the measurement time longer than a threshold time,
wherein the electronic memory stores the angle-of-view information representing the position, at which the partial region of the omnidirectional image is lastly displayed on the first screen, among positions of partial regions of the omnidirectional image each of which is displayed on the first screen longer than the threshold time, and
wherein the display control unit is further configured to display, on a second screen which is different from the first screen, the thumbnail image corresponding to the stored angle-of-view information representing the omnidirectional image.

2. The image processing apparatus according to claim 1, wherein the generating unit generates the thumbnail image after displaying the partial region of the omnidirectional image on the first screen is finished.

3. The image processing apparatus according to claim 1, wherein the omnidirectional image is an omnidirectional image generated by combining together a plurality of images obtained by a plurality of imaging devices.

4. The image processing apparatus according to claim 1, wherein the display control unit displays the partial region of the omnidirectional image corresponding to the angle-of-view information, on the first screen, before receiving the user's operation, when the angle-of-view information is stored.

5. An image processing method comprising:
displaying a partial region of an omnidirectional a image on a first screen;
changing the partial region of the omnidirectional image to be displayed on the first screen in response to a user's operation;
measuring time during which each of partial regions of the omnidirectional image is displayed on the first screen;

storing angle-of-view information representing a position of the partial region of the omnidirectional image which is displayed on the first screen and associating with the measurement time longer than a threshold time;

generating a thumbnail image from the omnidirectional image based on the angle-of-view information; and displaying, on a second screen which is different from the first screen, the thumbnail image corresponding to the stored angle-of-view information representing the omnidirectional image, wherein the angle-of-view information represents the position, at which the partial region of the omnidirectional image is lastly displayed on the first screen, among positions of partial regions of the omnidirectional image each of which is displayed on the first screen longer than the threshold time.

6. A non-transitory computer readable medium that stores a program configured to be executed by a computer, the program including instructions for:

displaying a partial region of an omnidirectional a image on a first screen;

changing the partial region of the omnidirectional image to be displayed on the first screen in response to a user's operation;

measuring time during which each of partial regions of the omnidirectional image is displayed on the first screen;

storing angle-of-view information representing a position of the partial region of the omnidirectional image which is displayed on the first screen and associating with the measurement time longer than a threshold time;

generating a thumbnail image from the omnidirectional image based on the angle-of-view information; and displaying, on a second screen which is different from the first screen, the thumbnail image corresponding to the stored angle-of-view information representing the omnidirectional image, wherein the angle-of-view information represents the position, at which the partial region of the omnidirectional image is lastly displayed on the first screen, among positions of partial regions of the omnidirectional image each of which is displayed on the first screen longer than the threshold time.

* * * * *